US012555604B2

(12) United States Patent
Kazansky et al.

(10) Patent No.: US 12,555,604 B2
(45) Date of Patent: Feb. 17, 2026

(54) METHOD FOR FABRICATING NANOSTRUCTURED OPTICAL ELEMENTS

(71) Applicant: University of Southampton, Southampton (GB)

(72) Inventors: Peter Kazansky, Southampton (GB); Masaaki Sakakura, Cambridge (GB); Lei Wang, Southampton (GB)

(73) Assignee: University of Southampton, Southhampton (GB)

( * ) Notice: Subject to any disclaimer, the term of this patent is extended or adjusted under 35 U.S.C. 154(b) by 1195 days.

(21) Appl. No.: 17/297,095

(22) PCT Filed: Nov. 26, 2019

(86) PCT No.: PCT/GB2019/053328
§ 371 (c)(1),
(2) Date: May 26, 2021

(87) PCT Pub. No.: WO2020/109768
PCT Pub. Date: Jun. 4, 2020

(65) Prior Publication Data
US 2022/0111470 A1  Apr. 14, 2022

(30) Foreign Application Priority Data
Nov. 26, 2018 (GB) ...................... 1819189

(51) Int. Cl.
*G11B 7/24047* (2013.01)
*B23K 26/00* (2014.01)
(Continued)

(52) U.S. Cl.
CPC ...... *G11B 7/24047* (2013.01); *B23K 26/0006* (2013.01); *B23K 26/0624* (2015.10);
(Continued)

(58) Field of Classification Search
CPC ... G11B 7/24047; G11B 7/00456; G11B 7/26; B23K 26/0006; B23K 26/0624; B23K 26/55; B23K 2103/54; G11C 13/048
See application file for complete search history.

(56) References Cited

U.S. PATENT DOCUMENTS 5,761,111 A    6/1998  Glezer
7,486,705 B2 * 2/2009  Shah ...................... H01S 3/102
                                                 372/6
(Continued)

FOREIGN PATENT DOCUMENTS

CN    108213718 A  *  6/2018  .......... B23K 26/046
JP    2005293736 A    10/2005
(Continued)

OTHER PUBLICATIONS

Wikipedia article on flattening (Year: 2017).*
(Continued)

*Primary Examiner* — Steven W Crabb
*Assistant Examiner* — Fahmida Ferdousi
(74) *Attorney, Agent, or Firm* — Renner, Otto, Boisselle, & Sklar, LLP.

(57) ABSTRACT

A method of fabricating an optical element comprises: providing a substrate of a transparent material; applying a plurality of circularly polarised focused femtosecond laser pulses to a volume within the substrate to create substantially spherical nanopores in the volume; and applying at least one and not more than ten non-circularly polarised focused femtosecond laser pulses to the volume to transform the spherical nanopores into oblate spheroidal nanopores.

19 Claims, 9 Drawing Sheets

(51) Int. Cl.
    *B23K 26/0622*     (2014.01)
    *B23K 26/55*     (2014.01)
    *B23K 103/00*     (2006.01)
    *G11B 7/0045*     (2006.01)
    *G11B 7/26*     (2006.01)
    *G11C 13/04*     (2006.01)

(52) U.S. Cl.
    CPC .......... *B23K 26/55* (2015.10); *G11B 7/00456* (2013.01); *G11B 7/26* (2013.01); *G11C 13/048* (2013.01); *B23K 2103/54* (2018.08)

(56) References Cited

U.S. PATENT DOCUMENTS

| | | |
|---|---|---|
| 2005/0064137 A1 | 3/2005 | Hunt et al. |
| 2017/0121493 A1 | 5/2017 | Meyerhoff |
| 2017/0351156 A1 | 12/2017 | Imai et al. |

FOREIGN PATENT DOCUMENTS

| | | |
|---|---|---|
| JP | 2007237221 A | 9/2007 |
| WO | 2015150566 A1 | 10/2015 |
| WO | 2019158910 A1 | 8/2019 |

OTHER PUBLICATIONS

Shimotsuma et al., "Ultrafast Manipulation of Self-Assembled Form Birefringence in Glass", Adv. Mater. 2010, 22, 4039-4043 (Year: 2010).*
Wang et al. 2018 J. Phys. D: Appl. Phys. 51 155101 (Year: 2018).*
P.G. Kazansky, H. Inouye, T. Mitsuyu, K. Miura, J. Qiu, K. Hirao, and F. Starrost, "Anomalous Anisotropic Light Scattering in Ge-Doped Silica Glass," Phys. Rev. Lett., vol. 82, 2199-2102, 1999.
J. Zhang, M. Gecevičius, M. Beresna, P.G. Kazansky, "Seemingly Unlimited Lifetime Data Storage in Nanostructured Glass," Phys. Rev. Lett., vol. 112(3), 33901, 2014.
E. Bricchi, B.G. Klappauf, P.G. Kazansky, "Form Birefringence and Negative Index Change Created by Femtosecond Direct Writing in Transparent Materials," Opt. Lett., vol. 29, 119-201, 2004.
S.S. Fedotov, A.G. Okhrimchuk, A.S. Lipatiev, A.A. Stepko, K.I. Piyanzina, G.Y. Shakhgildyan, M.Y. Presniakov, I.S. Glebov, S.V. Lotarev, V.N. Sigaev, 3-bit Writing of Information in Nanoporous Glass by a Single Sub-Microsecond Burst of Femtosecond Pulses, Opt. Lett., vol. 43, 851, 2018.
Y. Shimotsuma, P. Kazansky, J. Qui, and K. Hirao, "Self-Organized Nanogratings in Glass Irradiated by Ultrashort Light Pulses," Phys Rev. Lett. vol. 91, 247405 (2003).
M. Beresna, M. Gecevicius, M. Lancry, B. Poumellec, and P.G. Kazansky, "Broadband Anisotropy of Femtosecond Laser Induced Nanogratings in Fused Silica," Appl. Phys. Lett. vol. 103, 131903 (2013).
C. Hnatovskya, R.S. Taylor, P.P. Rajeev, E. Simova, V.R. Bhardwaj, D.M. Rayner, and P. B. Corkum, Pulse Duration Dependence of Femtosecond-Laser-Fabricated Nanogratings in Fused Silica, Appl. Phys. Lett., vol. 87, 014104 (2005).
International Search Report and Written Opinion of the International Searching Authority for corresponding International Patent Application No. PCT/GB2019/053328, dated Mar. 17, 2020.
Varapnickas Simonas, et al., "Polarization Effects in 3D Femtosecond Direct Laser Writing Nanolithography," Proceedings of SPIE, SPIE, US, vol. 10675, May 22, 2018.
UK Search Report, issued in Application No. GB 1819189.0, dated May 17, 2019.
Chris B. Schaffer, et al., "Morphology of Femtosecond Laser-Induced Structural Changes in Bulk Transparent Materials," Applied Physics Letters, vol. 84, No. 9, Mar. 1, 2004, pp. 1441-1443.
Eiji Toratani, et al., "Self-Fabrication of Void Array in Fused Silica by Femtosecond Laser Processing," Applied Physics Letters, vol. 87, No. 17, Oct. 18, 2005, pp. 171103-1 to 171103-3.

* cited by examiner

METHOD FOR FABRICATING NANOSTRUCTURED OPTICAL ELEMENTS

This application is a national phase of International Application No. PCT/GB2019/053328, filed on Nov. 26, 2019, which claims priority to GB Patent Application No. 1819189.0, filed on Nov. 26, 2018, the entire disclosures of which are hereby incorporated by reference.

BACKGROUND OF THE INVENTION

The present invention relates to a method for fabricating nanostructured optical elements.

A class of optical materials comprises transparent substrates internally structured with anisotropic nanopores that give birefringent properties to the material. This structure allows the materials to be used as elements for manipulating light via the geometric phase. Also known as the Panchatraman-Berry phase, this is a phase difference acquired by a wave, such as a light wave, over the course of a cycle. It occurs when both polarisation and phase are changed simultaneously but very slowly, and eventually brought back to an initial configuration. In other words, the light undergoes a cyclic adiabatic process. To achieve the geometric phase, the light wave is modified by transmission through an element with a nanoscale spatially varying anisotropy, to produce a phase difference or phase shift. Formation of such anisotropic sub-wavelength structures (nanostructures) was first reported in 1999 [1]. The nanostructure is formed by irradiating the substrate material, such as silica glass, with ultrashort pulses of laser light. More recently, this form of optical element has been proposed for data storage [2]. The individual nanopores have an anisotropic shape that gives a nanostructure comprising the nanopores an overall birefringence with an optical retardance value and slow axis of birefringence. Both the retardance and the slow axis can be controlled by setting properties of the laser pulses used to create the nanopores. Hence, by forming one or more nanostructure in a particular position using focused laser pulses, a data voxel with five degrees of freedom can be created: the three spatial dimensions corresponding to the voxel's position within the substrate, plus the retardance and slow axis values [3]. Data can be encoded by choosing values for these five properties, which offers a large data capacity, and the data accessibility is high because of the transparency of the substrate material. Significantly, data written in this way is expected to have an almost unlimited lifetime (estimated at longer than $10^{10}$ years at 462K). Such so-called 5D optical data storage is therefore an attractive option for meeting the demands of modern data storage, which requires durability, high capacity, and ease of accessibility in order to accurately preserve extensive digital data far into the future.

In order for 5D data storage to become a widespread solution, the writing of the data should be via an efficient and accurate process. In particular, the speed of the data writing is of interest, and preferably should be as fast as possible while providing consistent quality. To achieve a high speed, the writing is performed by directing the focused laser pulses to each required voxel position by scanning or translating the beam of laser pulses relative to the substrate. Each voxel is written using multiple pulses to achieve a homogeneous birefringence at the vicinity of the laser focus [4]. However, it is technically challenging to implement precise common positioning of the multiple pulses per voxel simultaneously with a high scanning speed. This presents an obstacle that limits maximum achievable data writing speeds.

Accordingly, techniques able to increase the speed of creating anisotropic nanopores in a substrate material are of interest.

SUMMARY OF THE INVENTION

Aspects and embodiments of the invention are set out in the appended claims.

According to a first aspect of certain embodiments described herein, there is provided a method of fabricating an optical element comprising: providing a substrate of a transparent material; applying a plurality of circularly polarised focused femtosecond laser pulses to a volume within the substrate to create substantially spherical nanopores in the volume; and applying at least one and not more than ten non-circularly polarised focused femtosecond laser pulses to the volume to transform the spherical nanopores into oblate spheroidal nanopores.

According to a second aspect of certain embodiments described herein, there is provided an optical element fabricated according to the method of the first aspect.

According to a third aspect of certain embodiments described herein, there is provided a method of processing an optical substrate comprising: providing a substrate of a transparent material; and applying to each of a plurality of volumes within the substrate a plurality of circularly polarised focused femtosecond laser pulses to create substantially spherical nanopores in each volume.

According to a fourth aspect of certain embodiments described herein, there is provided an optical substrate of transparent material comprising, within a plurality of volumes within the substrate, substantially spherical nanopores created by the application of a plurality of circularly polarised focused femtosecond laser pulses to each of the plurality of volumes within the substrate.

According to a fifth aspect of certain embodiments described herein, there is provided a method of storing data in a multi-dimensional optical memory comprising: providing an optical substrate of transparent material comprising substantially spherical nanopores in each of a plurality of volumes within the substrate; applying to each of at least some of the volumes at least one and not more than ten non-circularly polarised focused femtosecond laser pulses to transform the spherical nanopores into oblate spheroidal nanopores, wherein for each volume the orientation of the non-circular polarisation and/or the ellipticity of the non-circular polarisation is selected in order to achieve a desired birefringence slow axis orientation and/or birefringence retardance value for the oblate spheroidal nanopores in order to encode data.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, nanostructured optical elements and methods for fabricating such elements may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
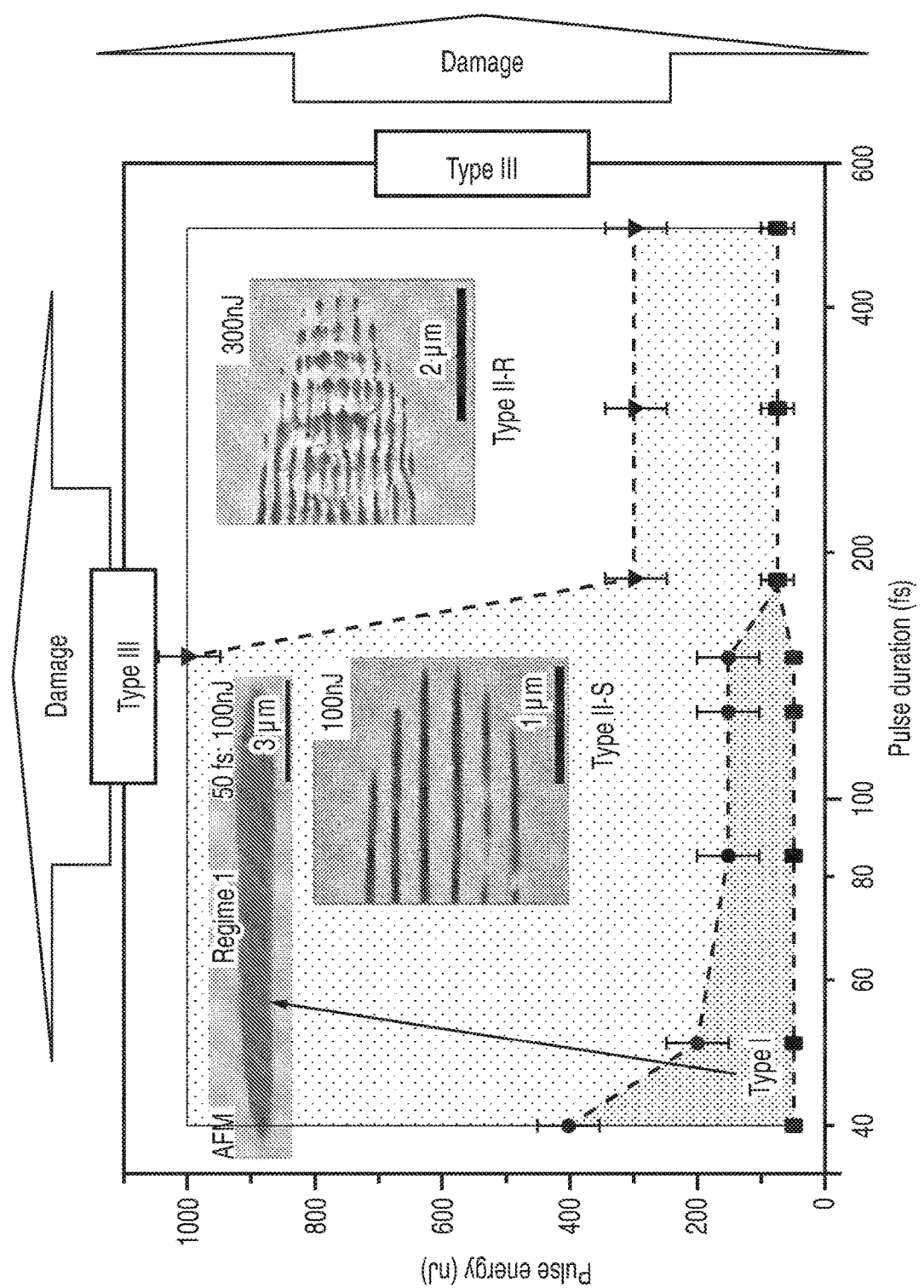
FIG. 1 shows a map of nanostructural modification type dependence on the energy and pulse duration of a writing light beam.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the present disclosure relate to methods for fabricating nanostructured optical elements, for example elements for optically storing data and elements that use the geometric phase effect to modify the polarisation and/or phase of light. In the present disclosure, the term "optical element" refers to a substrate of appropriate material patterned with a nanostructure as described for optical use, regardless of the nature of the intended application, use or purpose of the nanostructured material. Such applications may or may not make use of the geometric phase or relate to data storage.

An alternative to conventional geometric phase devices such as those based on liquid crystal materials that offer better durability and uniformity is a nanostructure induced in a suitable material such as glass using an incident ultrashort (ultrafast) pulsed laser beam. An example of a geometrical phase element of this type is a radial/azimuthal polarisation converter or "S-waveplate", described in WO 2015/150566 [5], which is able to transform incident linearly or circularly polarised light into radially/azimuthally polarised light or an optical vortex respectively. As noted in the Background section above, another significant use of such elements is for optical data storage. The nanostructure of the optical element comprises a collection of nanopores in a periodic or random distribution in an optically transparent material, such as silica. The nanopores are nanometre-scale structural modifications or changes in the bulk material. Although not yet well understood, the nanopores are likely to be voids created in the bulk material by the action of the incident laser pulses, and have a shape and orientation that depends on the optical properties of the laser pulses, and which confer the birefringent properties to the material.

The laser-induced writing process for creating the nanostructures comprises scanning or writing an ultrashort pulsed focused laser beam over the material intended for the optical element, and is performed to deliver sufficient energy to create a nanostructure of a particular type, where various types are described in more detail below. Some nanostructures have the form of nanogratings, in which an amount of optical energy is delivered which causes the nanopores to become self-organised into a periodic distribution that acts as an optical grating. In an early example of nanogratings [6], the formation of self-organised sub-wavelength periodic structures with feature sizes as small as 20 nm in bulk $SiO_2$ (silicon dioxide or silica) glass after irradiation with ultrashort light pulses from a Ti:sapphire laser was observed. Other examples of femtosecond laser-induced nanogratings in silica have also been reported [7]. Latterly, the phenomenon has been generalised to recognise different types of structural modification that can be induced by ultrafast laser irradiation of bulk optically transparent material, in particular silica glass. The type of structure is dependent in part on the parameters of the incident laser pulses. The structural modification is the presence of the nanopores, and is in effect a change in the material that alters its refractive index and provides a birefringence. Hence the optical properties of materials can be engineered by writing nanostructures into the material.

FIG. 1 shows a plot of the relationship between laser pulse duration and pulse energy and the resulting structural change induced in a bulk transparent material, in this case fused silica. The pulsed laser beam is focused and directed at a location or moved or scanned along a path over the surface of a sample or blank of the material (a substrate) to induce the structural change in the volume of the material behind the area covered by the scan path, at a rate that can be referred to a writing speed or scan speed. For a given pulse repetition rate, the speed of the writing determines the number of pulses delivered to any part of the material, referred to as the pulse density, in units of number of pulses per distance of path length. The total amount of energy delivered to the material then depends on the energy per pulse. A faster writing speed gives a lower pulse density and lower total energy for a given pulse energy, and a slower writing speed gives a higher pulse density and higher total energy for a given pulse energy. The data in FIG. 1 is obtained for a constant writing speed that is considered to be a slow writing speed, delivering a pulse density of more than $10^6$ pulses per millimetre of path length (pulse/mm). The laser emits femtosecond pulses, that is, pulses of duration up to about 1000 fs. Hence the structural modification induced by the energy of the incident laser pulses can be termed "femtosecond laser damage modification" (FLDM).

The type of structural modification, and the threshold of laser beam energy required to produce it, depends on factors including the laser parameters (pulse duration, pulse energy, pulse repetition rate, and wavelength), the numerical aperture of a lens or other focusing arrangement used to focus the beam onto or into the material substrate, and the properties of the material itself (including band gap and thermal properties).

Three types of modification that have been defined are shown in FIG. 1: types I, II and III. These are described further below. In fused silica, the transition from type I to type II to type III is observed with an increase of pulse energy. Alternatively, type I may evolve into type II with an increased pulse duration or pulse density, if other parameters are constant. Hence, the total energy delivered by the pulses is relevant.

FIG. 1 shows that for shorter pulses and lower pulse energies, a type I modification is obtained, which is an isotropic, or smooth, refractive index change or modification, lacking birefringence owing to the absence of anisotropy. This is shown in the inset picture in FIG. 1 corresponding to the type I area, achieved using pulse energies between 50 and 100 nJ. At higher pulse energies and longer pulses, a type II modification is obtained, which is a form birefringence associated with nanogratings formed of self-assembled nanopores and a negative refractive index change. Type II modifications can be divided into two sub-types. Within the type II regime, lower energies and shorter pulses produce a type II-S (smooth) modification comprising nanogratings embedded in a smooth index modification. The type II-S area in FIG. 1 includes an inset picture of such a structure produced from 100 nJ pulses. Higher pulse energies and longer pulses produce a type II-R (rough) modification comprising a complex morphology of disrupted regions, nanogratings and smooth modification. The type II-R area in FIG. 1 includes an inset picture of such a structure produced from 300 nJ pulses.

In addition to type I and type II modifications, further increases in pulse energy and duration produce damage in the material; this is designated as a type III modification.

The formation of the various structural modification types is a competitive process, with a particular type dominating according to the processing conditions. Under certain processing conditions, type I can dominate over type II and III, or vice versa. Using short laser pulses, there is not enough energy deposited to the lattice of the bulk material to induce nanogratings or voids. Instead, random defects or nanostructures and local densification can be initiated which causes the positive index change. Alternatively, using extreme conditions such as high laser pulse repetition rates (typically in excess of 10 MHz), the laser pulses can provide sufficient accumulated heat and lattice thermalisation to induce permanent material modification. However, due to high fictive temperatures the structure has enough time to relax (erase) before the re-solidification takes place, resulting in densification and positive index change. Using low laser pulse repetition rates, longer laser pulses, high numerical aperture, or high pulse density, the threshold of energy from the laser pulses required for a type I modification overlaps with the energy threshold of type II or type III. In this case, the type II or III will dominate and the modification starts with the formation of nanogratings or damage, and the local temperature is low enough that the re-solidification takes place before the structure relaxes. Using very high energies, under any circumstances, the damage of type III is produced.

In summary, the type I structure has no optical anisotropy, the type II structure consists of nanogratings providing an anisotropic refractive index pattern and hence birefringence, where there is a strong dependence of the anisotropy on the polarisation of the writing beam, and the type III structure comprises damage with no polarisation-dependent anisotropy. A type II modification or structure behaves as a uniaxial birefringent material with an optical axis (slow axis of the birefringence) which is parallel to the direction of polarisation of the writing laser beam. The birefringence of the nanogratings is negative (for example, around $-5 \times 10^{-3}$ in silica). This is typical for lamellar-like form birefringence, and is of the same order of magnitude as the birefringence of quartz crystal ($9 \times 10^{-3}$). Consequently, these nanostructures are suitable for implementing geometric phase optics, as an alternative to conventional birefringent materials for phase manipulation of light. Type II nanogratings are self-assembled, meaning that individual nanopores or nanostructures making up the nanograting are arranged in a substantially regular and periodic placement or array. The self-assembly evolves with the number of pulses (pulse density) delivered to the irradiated region of the bulk material. The first pulses typically create randomly distributed nanostructures, with subsequent pulses enabling the modification to develop into a periodic lamellar-like nanograting.

Note that in the present disclosure, the term "nanostructure" may refer to individual structures (nanopores) within a nanograting (the nanograting is a collection of nanostructures or nanopores), or may refer to the overall structural modification making up a nanograting or other pattern of laser-induced structural modification (the nanograting is itself a nanostructure which is formed from nanopores). "Structure" and "nanostructure" may be used interchangeably, expect if specifically indicated otherwise, or clear from the context. The term "nanostructure" indicates a structure with dimensions on the nanometre scale (i.e. 1000 nm or less, typically much less), which can also be considered as "sub-wavelength" structures in that the dimensions are smaller than the wavelength of light for which the optical element is designed. Each nanopore is an individual structural modification on the nanometre scale, in the form of a void in the bulk material that has a shape and orientation defined by the properties of the writing laser pulses.

A further type of structural modification can be designated as type X [9], which can have a reduced optical propagation loss compared to type II structures. Typically, a high pulse density delivered at a slow writing speed is used to minimise loss in type II structures since this allows an improved quality of the self-assembled nanostructure. Type X structures can be written using a contrary approach of reduced pulse density, for example delivered by increasing the writing speed (and hence a reduction in the total energy delivered to the material), and can show a significantly reduced loss compared to type II nanogratings. The writing technique delivers to the bulk material a density of femtosecond pulses that in many cases is lower than $10^5$ pulses/mm (100 pulses/pm). The resulting type X nanostructures show a relatively low birefringence, around four times less than the birefringence of type II nanogratings. Conventionally, a birefringence of this size might be dismissed as impractical for some applications. However, it has been found that by shaping the fast writing laser beam with a low numerical aperture lens for a correspondingly long Rayleigh length, the nanostructures can be written with a relatively long length in the intended optical propagation direction through the optical element. Lengths of the order of 50 µm or more, for example up to about 100 µm, can be written. This length of nanostructure, lying along the light propagation direction, compensates for the low birefringence, since the required parameter for birefringent operation is phase retardance, defined as the product of birefringence and optical path length. For 5D data storage, the retardance parameter can be readily varied to encode the data by adjustment of the lens to control the nanopore length, and adjustment of laser energy and pulse quantity to control the density of the nanopores and the aspect ratio and volume of the individual nanapores.

A type X modification comprises randomly distributed individual nanopores or nanostructures, as would be expected in the absence of the high pulse density employed to form self-assembled regular type II structures. However, periodicity of the nanostructures is not required to provide the desired birefringence, which instead depends on the orientation of the individual structures within the bulk material. Hence, the absence of self-assembly is not a barrier to the production of high quality optical elements. Also, the type X anisotropy is controlled by the polarisation of the laser writing beam. Each nanopore has an anisotropy defined by its shape, which is an oblate spheroid (ellipsoid) shape, or lenticular shape. As noted, the nanopores are randomly spaced apart within the substrate material, although lying generally within a layer at a constant depth behind the optical input surface of the optical element. More than one layer may be written depending on the intended use of the optical element; 5D data storage may use multiple layers, for example, each being a layer of voxels in a 3D array, and the nanopores within each layer being grouped into separate voxels. Each voxel comprises a plurality of nanopores which may have substantially the same or a similar size, shape and orientation, and the average orientation of the nanopores in a voxel is determined by the polarisation orientation of the writing pulses. These properties vary between voxels in order to encode data via differences in the retardance and the slow axis. The oblate spheroid shape of each nanopore is oriented with the plane of its circular cross section parallel to the optical propagation direction through the optical element and perpendicular to the input surface of the optical element (the surface scanned by the writing beam). The elliptical or oval cross-section which is parallel to the input surface can be oriented with its major axis at any angle, where the major axis is formed perpendicular to the polarisation of the writing light beam. The minor axis is parallel to the polarisation of the writing light beam. Since the overall shape is lenticular, the extent of the nanostructure in the optical propagation direction, namely the length along the direction through the thickness of the optical element from the input surface to the output surface, may be the same as or similar to the major axis. The overall shape of the nanostructure is determined by the intensity distribution of the laser pulses near the focal point.

Figure 2:
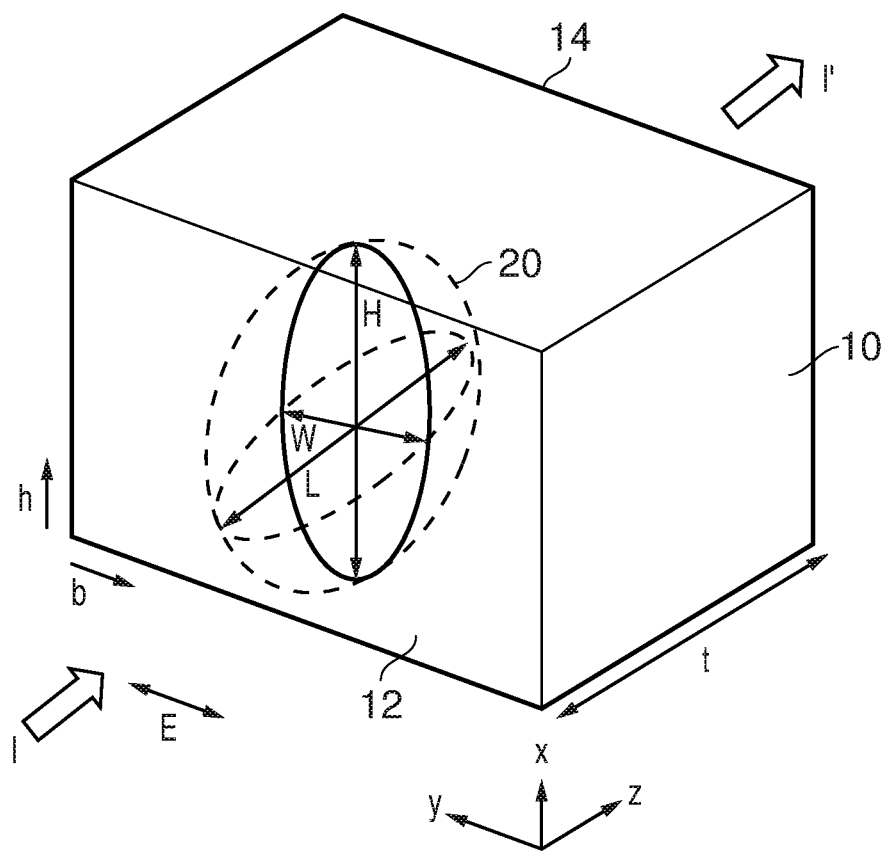
FIG. 2 shows a simplified schematic representation of an individual oblate anisotropic nanopore or nanostructure within a substrate.

FIG. 2 shows a highly schematic and not-to-scale representation of an individual nanopore 20 within an optical element 10. For clarity, just a single nanopore is shown, but as described above, in reality the nanostructural modification comprises many such nanopores randomly arranged within the material of the optical element. The optical element 10 has an input face 12 for receiving incident light, which propagates through the optical element along a propagation direction z which is parallel to the thickness t of the optical element and leaves through an output face 14 opposite to the input face 12. For the initial writing, the incident light beam I has a polarisation E which in this example is linear and aligned parallel to the y direction, or breadth of the sample forming the optical element 10. In use of the formed optical element, an incident or input light beam I is modified or transformed into output light beam I' by the birefringence of the optical element 10 created by the writing process, or used to read data encoded by the nanopores. The nanopore 20 has a length L substantially parallel to the thickness t of the optical element, which is typically not greater than 100 nm. The length L is perpendicular to the plane of the input face 12. The nanopore 20 has a cross-sectional shape in a plane parallel to the input face which has an oval, elliptical or oblate shape, with a major axis or height H and a smaller minor axis or width W orthogonal to the height. The major axis is larger than the minor axis. The width W has a size not larger than about 30 nm, typically. Owing to the oblate spheroidal shape of the nanopore 20, the length L and the height H may be substantially equal so that the cross-section of the nanopore 20 through the length L and height H is roughly circular. In some cases there may be some small or more significant difference between the length L and height H, since the growth of the nanopore during the writing process along these two dimensions may evolve differently. For example, the length L may become greater than the height H. Typically, though, L and H will be at least similar to each other when compared to the width W, which is less than both. The input face 12 has a height dimension h and an orthogonal breadth direction b. The width W and height H of the nanostructure 20 lie at some angle to the height h and the breadth b; this sets the orientation of the nanopore which is defined as lying along the height direction (major axis). Either of H and W can be parallel to either of h or b, or can be arranged at any angle between the parallel alignment. This orientation (direction of the major axis H) is the direction (azimuth) of the slow axis of the birefringence offered by the nanostructure comprising the nanopore. The orientation is set by the polarisation E of the incident light beam, where W is parallel to E and H is perpendicular to E. Hence, rotation of the polarisation direction of the writing light beam controls the slow axis direction of the generated birefringence. The length L of the nanopore 20, being the dimension along the optical propagation direction, partly determines the total retardance available from the birefringence, and can be varied by controlling the amount of optical energy applied to form the nanopores. The contribution of the nanopore shape to the retardance varies by nanopore volume and the ratio between W and H. The overall total retardance depends also on the density of the nanopores and the length of the region or volume containing the nanopores. The total energy can be modified by changing parameters including the pulse duration, individual pulse energy, pulse repetition rate, number of pulses and numerical aperture of the pulse focusing. Hence, both the retardance and the slow axis orientation of the birefringence provided by a nanostructure can be readily controlled.

Type X can be thought of an intermediate type of structural modification, having a random distribution of nanostructures which nevertheless has a strong polarisation-dependent anisotropy. Visually, a type X structure has the appearance of a type I modification (with high transmission and therefore not readily apparent to visual inspection) combined with the behaviour of a type II modification (strong anisotropy).

Figure 3A:
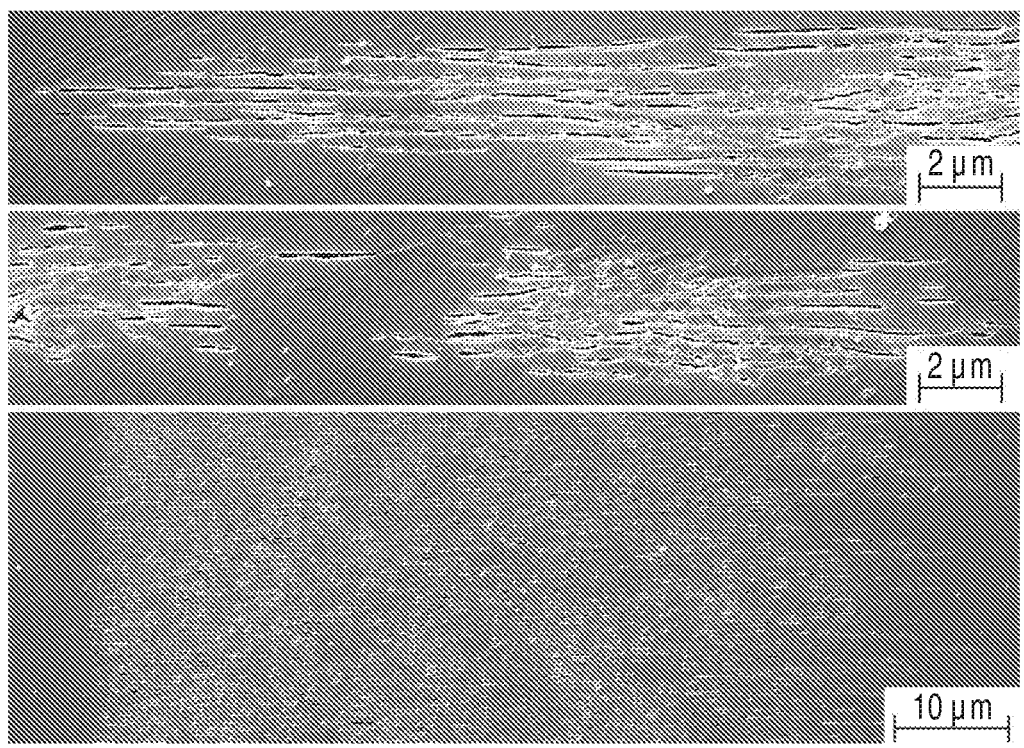
FIG. 3A shows scanning electron microscope images of a type II nanograting structural modification in silica.
Figure 3B:
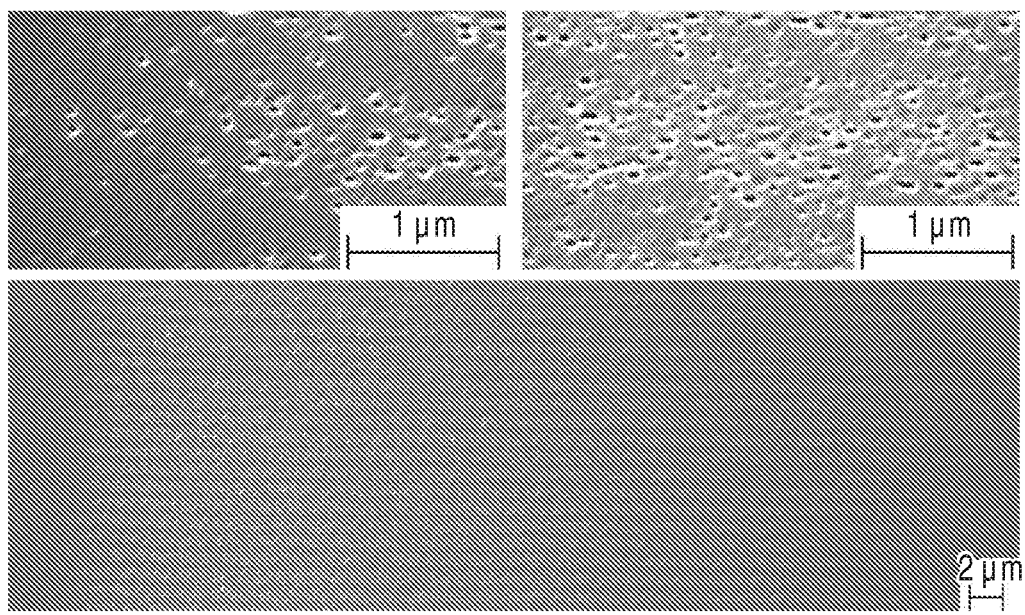
FIG. 3B shows scanning electron microscope images of a type X nanostructural modification in silica.
Figure 3C:
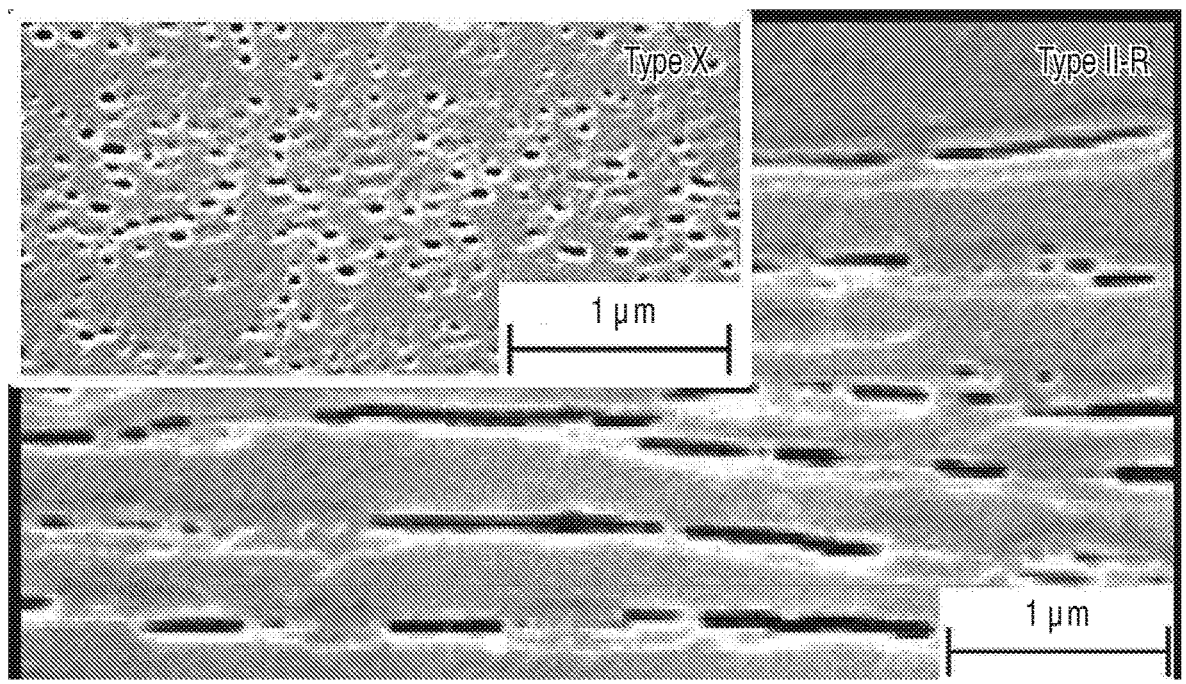
FIG. 3C shows scanning electron microscope images of a type X nanostructure and a type II nanograting.

FIGS. 3A, 3B and 3C show scanning electron microscope (SEM) images of examples of structural modifications written into bulk silica. FIG. 3A shows three images of cross-sections through silica (of which two are "close-up" images and one is a wider angle view, as indicated by the scales shown) having a type II-R modification written with a pulse density of $>10^5$ pulses/mm. The regular, periodic arrangement of the lamellar-like structures making up the nanograting is readily apparent. FIG. 3B, in contrast, shows three images (again at different scales, as indicated) of cross-sections through an element into which a type X modification has been written using a pulse density of <$10^5$ pulses/mm. The random distribution of the nanopores and the oval cross-sectional shape can be seen. For ease of comparison, FIG. 3C shows an image of a type X modification and an image of a type II-R modification at the same magnification, from which the different shapes and arrangements of the two modification types can be readily appreciated.

Note that in the present disclosure, the term "random" is used to describe that the nanostructures or nanopores in a type X modification are arranged without any discernible periodicity or pattern. The spacing between adjacent nanostructures or nanopores is random, and the individual nanopores are positioned at random in a layer within the thickness of the bulk material.

Figure 4:
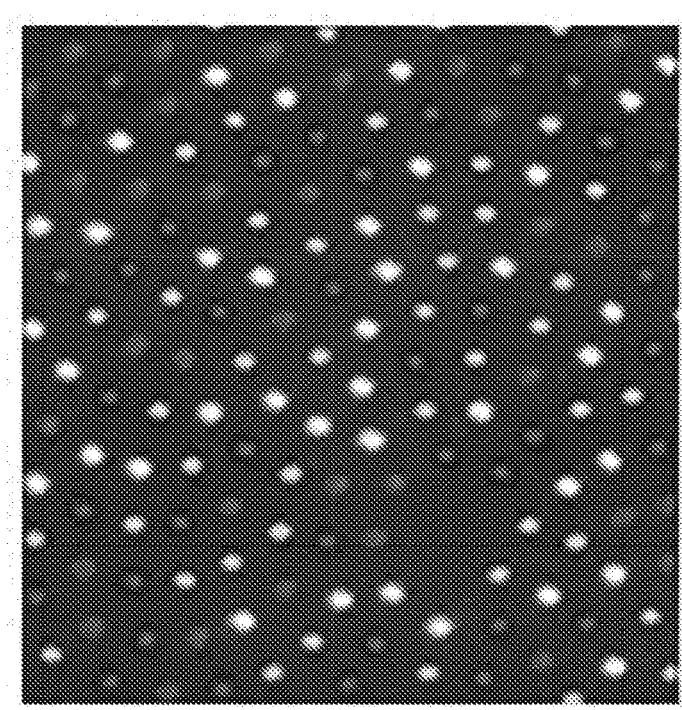
FIG. 4 shows a birefringence image of discrete nanostructures of different birefringence formed in a substrate

FIG. 4 shows a birefringence image of a further type X modification, comprising a plurality of dots written inside silica. Each dot comprises a plurality of nanopores (so each dot might be considered as a nanostructure, for example), and may make up an individual voxel in a data storage element, for example. The different brightnesses of the dots arises from the different slow axes offered by the different nanostructures, and the different diameters of the dots indicates different values of retardance. Each dot is written separately by applying ultrashort pulses of polarised laser light focused to the desired location in the silica substrate. The orientation of the slow axis of the birefringence is set by the orientation of the polarisation, and the magnitude of the retardance is set by the total number of pulses and the energy per pulse, combining to give a total optical energy delivered at that location.

For both type II structures and type X structures, it is typical to apply a multiplicity of ultrashort laser pulses to the substrate material, in order to create a consistent and uniform birefringence. For example, about 10 or 50 or 100 pulses or more might be used. The laser light is linearly polarised, where a defined polarisation direction is required in order to shape the nanopores into an oblate spheroidal shape, to achieve the anisotropy that produces the desired birefringence. The polarised light has an anisotropic electric field distribution which is enhanced at the equators of the initially spherical nanopores induced in the substrate material by the laser pulses and causes the spheres to grow into oblate shapes with a longer dimension oriented perpendicular to the polarisation direction of the laser light.

This use of multiple pulses for writing presents an obstacle to the goal of increasing the speed of writing of the nanostructures, which is generally important, and particularly relevant in the context of realising efficient data storage from 5D optical data elements. Fast relative movement between the beam of laser light and the substrate into which the nanostructures are written to achieve scanning of the writing beam over the substrate makes it very difficult to focus multiple pulses at the same location within the substrate. Hence, it is difficult to accurately write a voxel using a high writing speed.

The present disclosure proposes a different method of creating nanoscale structural modifications in the substrate material that enables much faster writing speeds. According to the proposed method, it is possible to create birefringence-providing nanopores at a single location, such as for a data storage voxel, with as few as one single laser pulse.

The method utilises a two-stage approach. In a first stage, a plurality of ultrashort pulses of circularly polarised laser light are focused into a substrate of transparent material. The pulses generate nanopores, as expected, but owing to the use of circularly polarised light which lacks any enhanced direction of the electrical field, the nanopores retain a substantially spherical shape. Hence, the nanopores are optically isotropic, and lack the anisotropic shape required to provide birefringence. This creates an intermediate state in the substrate which is primed or seeded for conversion or modification into a birefringent anisotropic structure. Hence, the first stage can be considered as a seeding stage, with the applied pulses being seeding pulses. The intermediate stage is a reactive condition of the substrate material, in that the material is able to react to further applied light pulses in order to evolve into an anisotropic nanostructure with birefringence.

Accordingly, in a second stage, one single pulse (or in some embodiments a small number of pulses) are focused into the volume of the substrate in which the reactive state spherical nanopores have been formed in the first stage. In the second stage, however, the light has a non-circular polarisation, by which it is meant that the light is polarised with a linear polarisation or an elliptical polarisation (rather than being unpolarised). This polarisation state provides the appropriate electric field shape to push or evolve the spherical nanopores into an oblate spheroidal shape, so that birefringence is achieved. Since this second stage creates the final desired nanopore structure, it can be considered as a writing stage.

The mechanism of forming oblate spheroidal nanopores requires energy to be delivered to the substrate material by the pulses of laser light. The ultrashort duration of the pulses (sub-1000 fs, or femtosecond pulses) provides very high peak energy compressed into a very brief time scale, so the energy is delivered without causing bulk damage to the material. The initial creation of the nanopores, formed as voids within the substrate material, accounts for the majority of the energy required to form the completed nanopore. According to the two-stage process, this energy is provided by the multiple pulses of circularly polarised light to create spherical nanopores. Circular polarisation is relatively simple to provide. In order to develop the desired birefringence from the nanopores, it is necessary to break the isotropy of the spherical shape. This can be done using non-circularly polarised light, since the spherical nanopores are reactive to such polarised light. However, the energy required for this is very much less than the energy needed to make the nanopores in the first place, so that just one single ultrashort pulse of non-circularly polarised light can be used to alter the nanopores into an anisotropic oblate spheroidal shape.

Hence, the act of actually writing a birefringent nanostructure, such as a voxel in a data storage element, is performed with as few as one ultrashort pulse. Difficulties of aligning a plurality of writing pulses precisely into the same location are thereby avoided, and the speed of the writing process can be increased. The preliminary seeding stage can be carried out with less spatial precision so that high writing speeds can be used here also. The level of retardance of the final nanostructure, which depends on parameters including the amount of optical energy and the focusing, can be set in part by the seeding pulses. The slow axis value is then set by the orientation of the polarisation axis of the writing pulse. The writing pulse ellipticity, and a variation in the number of writing pulses, can be used to further define the retardance value.

The reactive state comprising the non-birefringent structure of spherical nanopores is an enduring physical state of the substrate material, and is not known to diminish or fade with time. Hence, there is no limitation placed on the time scale of the second, writing stage relative to the first, seeding stage. The stages can be performed in a single process, where each of many volumes in a substrate are written in turn, firstly by application of the seeding pulses and then by application of the writing pulse, before the next volume is addressed. For this, it is merely necessary to switch the polarisation state of the light pulses between the stages; the same laser beam can be used for both seeding and writing. Alternatively, the whole substrate can be scanned with the seeding pulses to form the reactive state throughout all required regions in the substrate, followed by application of the appropriate writing pulses to the appropriate locations, as a sequence scanned over the substrate. With this approach, the first stage and the second stage can be performed in one procedure, or alternatively may be entirely separated from one another, in time, and optionally also in space. In such an arrangement, the first or seeding stage can be considered as a processing stage for processing an optical substrate, from which an optical element will be fabricated using the second or writing stage. For example, a first party can carry out the seeding stage on substrates in order to produce multiple substrates primed or prepared for data storage. At a later time, the same party, or a second party possibly at a different location, can record data into one or more primed substrates using the second stage. Alternatively, the second stage can be configured to form optical elements for geometric phase applications or other birefringence applications, rather than optical data storage.

Figure 5:
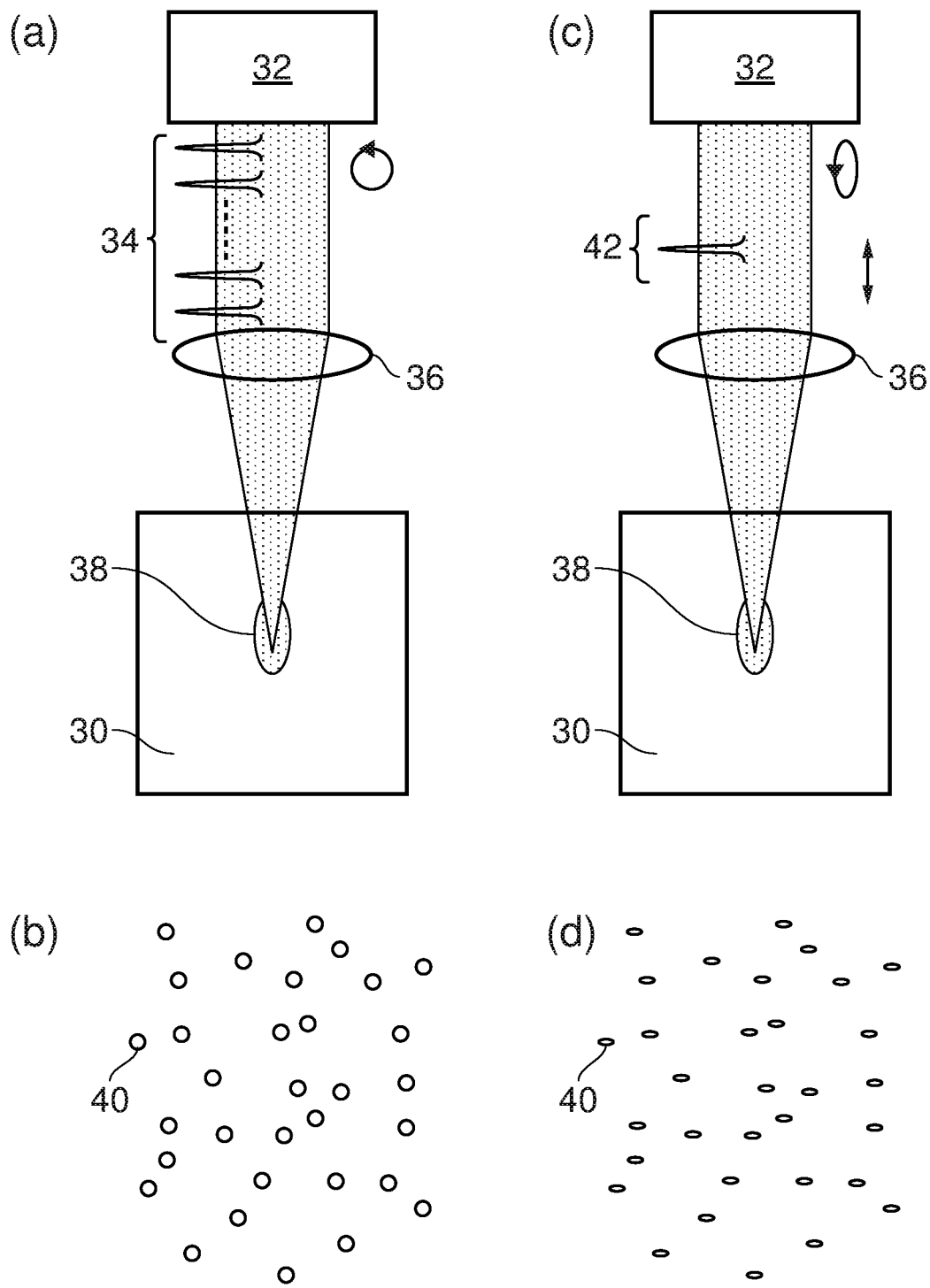
FIG. 5 shows a simplified schematic representation of first and second stages in a method for creating nanostructures according to an example.

FIG. 5 shows a highly simplified schematic representation of the first and second stages of the proposed method. In FIG. 5(a), an optical source in the form of a laser 32 emits a sequence of femtosecond pulses 34 of circularly polarised light. Using a lens 36 or other focusing arrangement (providing, for example a numerical aperture of around 0.16), the pulses 34 are focused to a focal point or region 38 inside a substrate 30 of a suitable optically transparent material such as silica. This process forms a plurality of randomly distributed spherical nanopores 40 within the silica, in the volume of the focal region 40, as shown in FIG. 5(b). In this way, the silica glass has been subjected to a seeding stage and modified into a reactive state or condition in that volume within the substrate, being a state in which the silica is sensitive to, or able to react to, polarised light which will further modify its structure.

In FIG. 5(c), immediately following the seeding stage of FIG. 5(a) or at some later time, the optical source 32 (or alternatively a different optical source) provides a single femtosecond pulse 42, of non-circularly polarised light (so, linearly polarised or elliptically polarised). The pulse 42 is focused by a focusing arrangement to the same focal region or volume 38 in the substrate 30. Its polarised nature acts to transform the nanopores 40 in the spherical shape of the reactive state by changing their shape to oblate spheroids, as shown in FIG. 5(d). The short dimension of the oblate shape is parallel to the polarisation axis of the non-circularly polarised light.

Figure 6B:
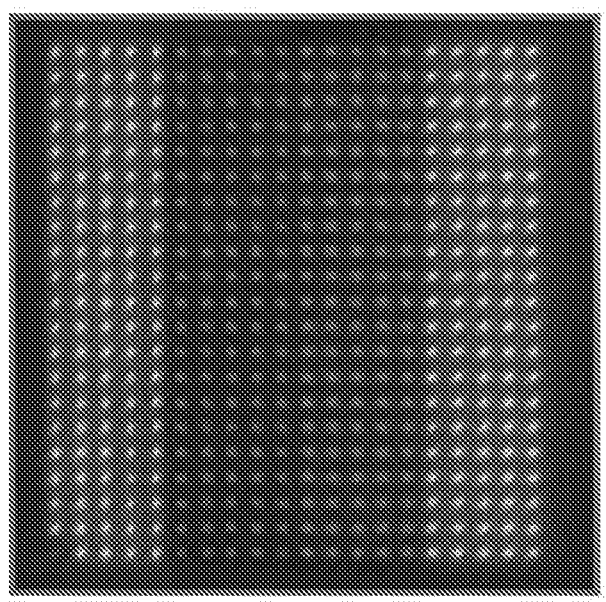
FIG. 6B shows a birefringence image of a substrate to which a first stage and a second stage of an example method have been applied.
Figure 6B:
Figure 6A:
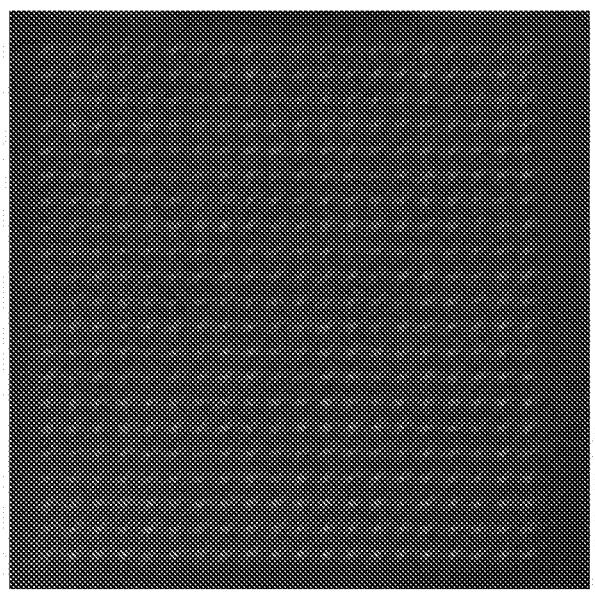
FIG. 6A shows a birefringence image of a substrate to which a first stage of an example method has been applied.

FIG. 6A shows a birefringence image of a silica substrate after undergoing a seeding stage, by application of 150 laser pulses of circularly polarised light to each of a plurality of locations in the substrate. Each location is barely distinguishable, indicating that no appreciable birefringence has been created by the seeding. Rather, the silica is in a polarisation reactive state, defined by spherical nanopores. The retardance was measured to be less than 1 nm, which is indistinguishable from noise in the measurement system. Experimentation has shown that retardance levels up to about 2 nm are acceptable after the seeding stage.

FIG. 6B shows a birefringence image of the same substrate after undergoing a writing stage. Each location that received the seeding pulses was subjected to a single femtosecond laser pulse of non-circularly polarised light, in this example elliptically polarised light. A bright spot is now visible at each location, indicating that a significant birefringence has been created. The retardance was measured to be about 7 nm. It will be observed that the spots are in four groups, of different apparent brightness. This reflects different colours in the original birefringence image, corresponding to different orientations of the birefringence slow axis for each group. The slow axis orientation is indicated at the left side of the image, and was controlled during writing by changing the polarisation axis of the writing pulse.

In order to produce such an optical element, the first and second stages are applied to multiple volumes within a substrate. The volumes may be substantially the same for each stage. Alternatively, the seeding stage volume may be larger so that the writing stage volume can be placed within it. The multiple volumes may be contiguous so as to firstly prime and then nanostructure continuously throughout the substrate. Alternatively, the volumes can be discrete and spaced apart from one another, for example to write voxels for data storage where the three dimensions of the voxel's position within the substrate provide three degrees of freedom for encoding data. In a further alternative, the seeding stage may be performed over contiguous volumes, for example by scanning the beam of pulses along a continuous path over the substrate surface, while the writing stage is applied to spaced-apart volumes at chosen locations.

The number of seeding pulses of circularly polarised light used for one focal region or volume in the first stage should preferably be 40 or more. Typically, a number of pulses up to 200 will provide adequate nanopore formation. Hence, the number of seeding pulses may be in the range of 40 to 200 inclusive. More particularly, the number of seeding pulses may be between 50 and 200, or between 50 and 150, or between 50 and 100, or between 100 and 150, or between 100 and 200, or between 40 and 150, or between 40 and 100. Pulse numbers in excess of 200 are not excluded, and may be used if desired or deemed necessary or appropriate. Overall, an aim is to deliver a total amount of optical energy which is at or in excess of a threshold value for creating the spherical nanopores. Example values of individual pulse energy may be around 0.7 µJ with a focusing condition with a numerical aperture of about 0.16, for example, or may be in the range of 0.65 µJ to 0.78 µJ. Other pulse energies are not excluded. In combination with the numbers of seeding pulses, this gives a total energy of about 26 µJ or above, for example up to about 156 µJ. These values are applicable to silica; other materials may require different amounts of energy to achieve a comparable effect.

As described, a sufficient amount of anisotropy can be obtained from just one writing pulse applied to a reactive state of silica. A single pulse is attractive in avoiding any need for spatial alignment of pulses into the focus region. However, in some cases, more than one pulse may be used, for example to increase the retardance by inputting more energy to the substrate material, or if control of the optical source to isolate a single pulse is impractical. A number of pulses for the writing stage can therefore comprise one pulse, two pulses, three pulses, four pulses, five pulses, six pulses, seven pulses, eight pulses, nine pulses or ten pulses.

Figure 7:
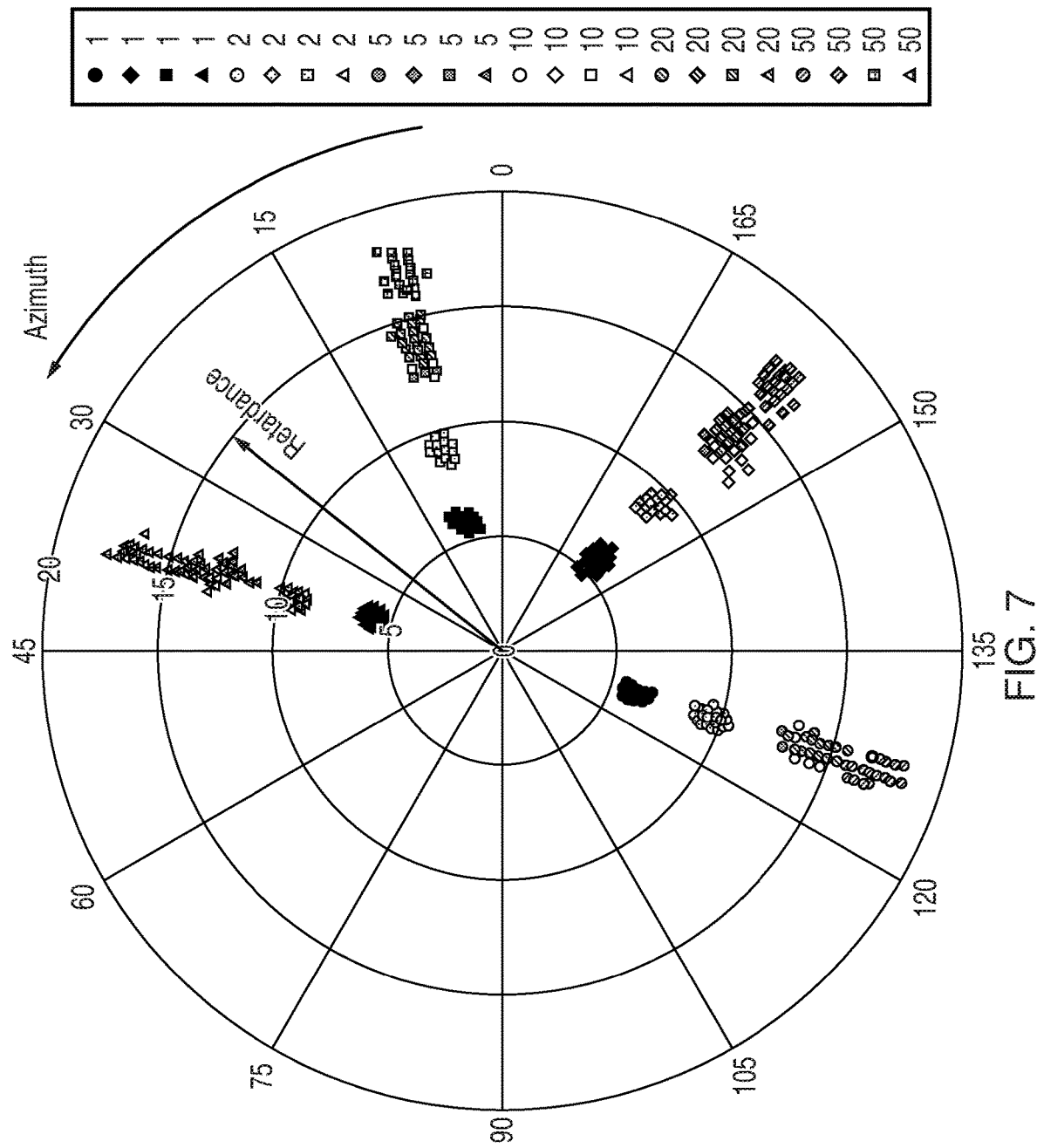
FIG. 7 shows a plot of measured birefringence azimuth and retardance values for nanostructures written using examples of two-stage methods described herein.

FIG. 7 shows a graph plotting retardance value against azimuth of the slow axis for a plurality of birefringent nanostructures fabricated using a two-stage seeding-plus-writing approach as described above. In each case, the seeding stage comprised 150 seeding pulses, each of energy 0.9 µJ (so that the total energy in the seeding stage was 135 µJ). The writing stage variously comprised one pulse, two pulses, five pulses, ten pulses, 20 pulses or 50 pulses. A key indicating the symbols used for the various numbers of writing pulses is shown to the right of the graph. The results for one writing pulse appear as clusters of data points closest to the centre of the graph, with a retardance value of about 7 nm. Clusters of data points for two writing pulses show a retardance value of about 9 nm, reflecting the increase in retardance achievable from the extra energy provided by additional writing pulses. The data for the remaining writing pulse numbers is grouped together from about 12 nm of retardance outwards. Five writing pulses provided about 14 nm of retardance, with similar values obtainable for ten writing pulses. The larger writing pulse quantities of 20 pulses and 50 pulses show an increased retardance, but the increase is not substantial, and the difficulties in positioning multiple pulses correctly in the writing region increase with increasing number of pulses. Hence, there is no significant benefit to using large numbers of seeding pulses. Accordingly, ten writing pulses is believed to be an appropriate maximum number that offers a substantial retardance without excessive difficulty in alignment to slow the writing process.

Note that it is within the contemplated scope of the disclosure that forming nanostructures in a substrate may comprise the use of different numbers of writing pulses to write nanostructures at different positions. This provides a straightforward way to vary the retardance across the substrate, if required. In the context of data storage, the retardance of each voxel can be controlled by selection of the number of writing pulses, in order to access this degree of freedom for encoding data.

The data in FIG. 7 also demonstrates that different values of the birefringence slow axis (azimuth) are readily obtainable. This is achieved by controlling the polarisation orientation of the writing pulse or pulses. In the case of elliptically polarised light, the orientation is the angular orientation of the major axis of the ellipse. Azimuth accuracy down about 5 degrees has been readily obtained in initial experiments, and it is expected that increased accuracy is attainable if sufficiently accurate and sensitive apparatus for defining the writing beam polarisation is utilised.

The bulk material of the substrate used to form an optical element using the described two-stage process is a transparent material, meaning that it has a significant transmission for at least some wavelengths across the spectrum from ultraviolet to the near-infrared (roughly 200 nm to 2500 nm). It should have a high transparency at the wavelength used for the seeding laser pulses and the writing laser pulses (which may or may not be obtained from the same laser beam, or otherwise have the same wavelength), and also for the intended light beams to be used with the finished optical element (for reading stored optical data, or to be optically transformed or manipulated by the element). Usefully, the material may be an amorphous glass material. For example, it may be silica (silicon dioxide, $SiO_2$), including fused silica. The silica or other glass material might be doped with other materials to modify its optical properties. Examples of doped or multicomponent glasses may include materials such as $Al_2O_3$, $B_2O_3$, alkaline earth oxides and $Na_2/K_2O$ but other elements and compounds may be used; the disclosure is not limited in this regard. Other materials for the optical element may be any material able to support the laser induced nanostructures, including materials in which nanogratings such as a type 11 modification or a type X modification have previously been demonstrated. These include multicomponent glasses, $GeO_2$ glass, porous glass, aerogel glass, silicon and silicon materials, semiconductor materials, lithium niobate and other lithium oxide compounds. Other materials are not excluded, however. In the case of doped silica or other materials, the parameters of the laser pulses may require selection to take account of the physical properties of the material, in particular the bandgap and the thermal properties. The nanostructures are formed so as to be embedded within the volume of the material of the optical element. They can be formed in single layer, with a thickness of the layer being in a range of about 50 µm to about 500 µm. Control of the seeding and writing laser pulse parameters and the focusing can create a plurality of layers at different depths in the element (i.e. at different positions along the length of the propagation direction of the seeding and writing pulses). As an example, the optical element may have a thickness on this direction of about 3 mm, although thicker and thinner dimensions can of course be used as convenient.

Figure 8A:
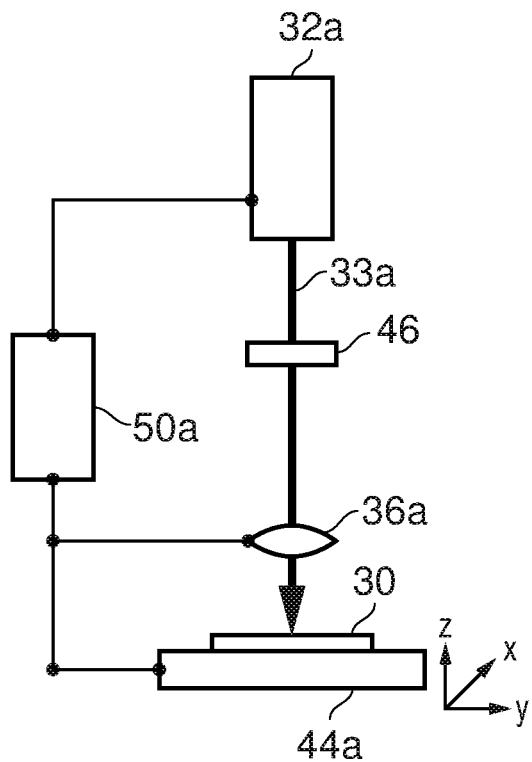
FIGS. 8A and 8B show simplified schematic representations of apparatus suitable for carrying out first and second stages of example methods described herein.
Figure 8B:
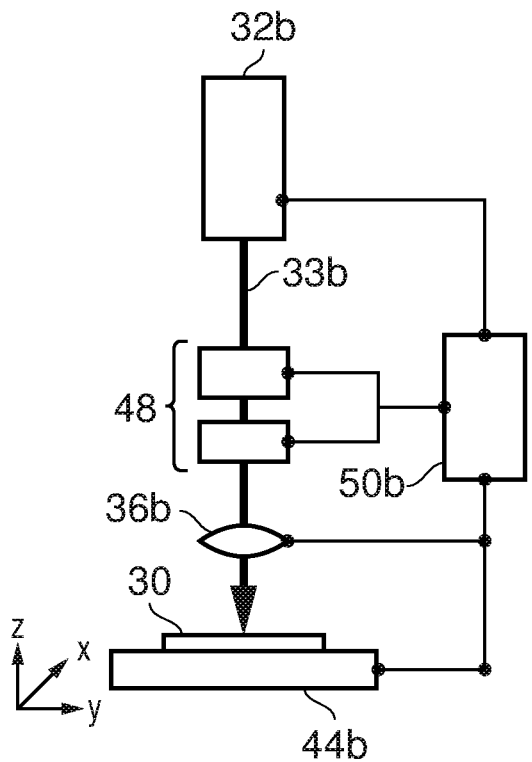

FIGS. 8A and 8B show schematic representations of apparatus suitable for performing examples of the described two-stage method. FIG. 8A shows apparatus for carrying out a seeding stage or step. A substrate 30 is mounted on a translation stage 44a. An optical source 32a operable to generate femtosecond laser pulses is arranged to direct a beam 33a of pulses onto the substrate 30, via a polarising arrangement 46 and a lens or other focusing arrangement 36a. The polarising arrangement 46 acts to give the laser light in the beam of pulses a circular polarisation. The focusing arrangement 36a is arranged to focus the beam of pulses to a desired volume or region of material inside the substrate 30. A controller 50a, which may a computer processor programmed with software, or hardware configured to perform a corresponding function, controls the optical source 32a, the lens 36a and the translation stage 44a. The optical source is controlled to generate pulses of a desired duration, repetition rate, pulse energy and wavelength in order to provide a required amount of optical energy to the volume in the substrate 30 in order to create the reactive state of material. The total number of pulses delivered to the volume is also controlled, in the range of about 40 to about 200, as described above. The position of the lens 36a is controllable to alter the position of the focal point of the laser beam within the substrate, in order to adjust the depth within the substrate 30 at which the volume of the substrate material which is modified into the reactive state is located. This alters the position of the focus in the z-direction. Also, the numerical aperture of the lens can be chosen to set the length of the focal region in this direction, which can modify the length of the nanopores and hence the retardance value. The translation stage 44a is controllable to provide relative movement between the beam 33a and the substrate 30 in the x-y plane, in order to scan the beam over the substrate. Hence, the focal position can be adjusted to any xyz location so that a reactive state can be induced at any location within the substrate, either as a continuous modification or multiple modifications at discrete spaced-apart locations with desired positions. Alternatively the relative movement can be provided by moving the optical source 32a, or by moving both the optical source 32a and the translation stage 44a.

FIG. 8B show apparatus for carrying out a writing stage or step. The apparatus may be substantially the same apparatus as for the seeding stage, or may be different apparatus in a different location or used at a later time. It comprises an optical source 32b operable to generate femtosecond pulses, directed as a beam 33b onto the substrate 30 previously seeded into a reactive state. The substrate 30 is mounted on a translation stage 44b as before, and the beam is focused into the substrate 30 by a lens 36b or focusing arrangement. The lens 36b and the stage 44b are under the control of a controller 50b in order to adjust the location of the focal point of the beam 33b in the substrate 30, as before. A polarising arrangement 48 is provided through which the beam 33b passes in order to induce an elliptical or linear polarisation state. The polarising arrangement 48 is also controlled by the controller 50b in order to set the orientation of the polarisation. It may comprise a collection of optical elements, for example it may include a pair of Pockel cells, so as to be operable to set any polarisation state between linear and circular and any polarisation orientation. Any other configuration of a universal retarder for achieving this level of polarisation control may alternatively be used. Also, the controller 50b acts to control the optical source 32b to deliver one single optical pulse (or a number of pulses up to ten as discussed) to a volume of the substrate 30 which is in the reactive state, to implement the writing stage.

The seeding stage and the writing stage can be carried out alternately to write a series of nanostructures into a substrate one at a time, by adjustment of the polarisation between circular and non-circular between the stages. Alternatively, the seeding stage can be applied to multiple volumes in a substrate, before the writing stage is performed on some or all of the multiple volumes at some later time. The later time may be immediately after the seeding stage, or after a lapse of time such as some minutes, an hour, a day, multiple days, a month, multiple months, a year or multiple years.

The seeding stage can be carried out using the same laser pulse parameters (duration, wavelength, energy, repetition rate, scanning speed) for all volumes in a substrate, and the writing stage parameters can be wholly relied on for setting the birefringence properties, in other words achieving a particular retardance and slow axis. This makes the method overall very simple. The slow axis orientation is modified by changing the orientation of the non-circular polarisation, and the retardance can be set by changing the pulse energy of the writing pulse or pulses, or by varying the number of writing pulses applied to a given volume between one and ten, and/or by altering the ellipticity of the non-circular polarisation state. The birefringence properties are chosen appropriately for the various volumes throughout a substrate in accordance with the intended use of the resulting optical device, such as optical data storage or optical elements such as wave plates. Other applications include the fabrication of space-variant retarders, polarisation converters, and flat or geometrical phase optics. Complex wave plate patterns and any phase profile optics with high density elements (sub-wavelength pixel size) can be manufactured for operation across a large spectral transmission window including ultraviolet and near-infrared wavelengths. Also, the high transmission and durability of silica elements enable applications requiring the polarisation/phase/intensity shaping of high-power laser beams.

Figure 9:
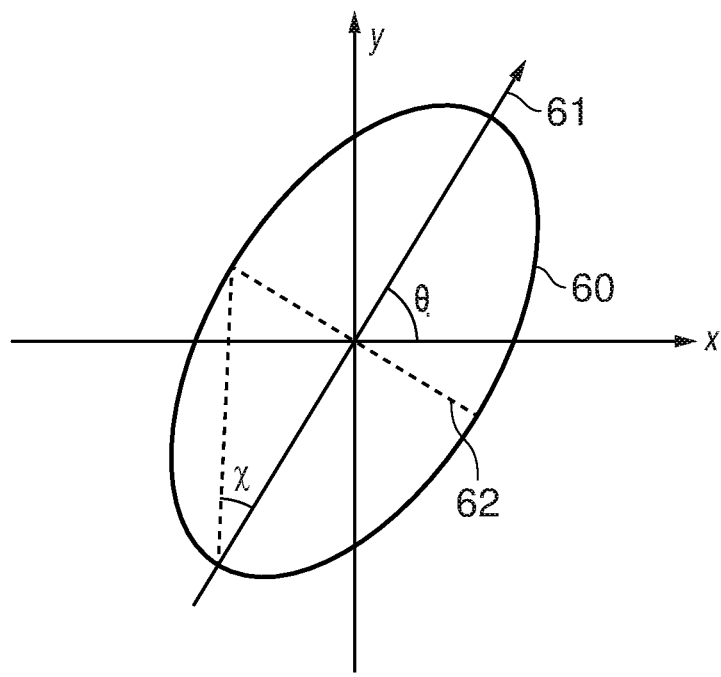
FIG. 9 shows a diagrammatic representation of elliptically polarised light with various parameters indicated.

FIG. 9 shows a diagram of an ellipse describing elliptically polarised light, in order to explain relevant parameters. The light propagates in the z-direction, into the page, and the elliptical polarisation lies in the x-y plane perpendicular to the propagation direction, namely the plane of the page. The ellipse 60 indicates the trajectory of the electric vector of the elliptically polarised light. In the conventional manner, the ellipse has a major (long) axis 61, and a minor (short) axis 62. The major axis is designated as the polarisation axis, or the direction or orientation of the polarisation. The major axis lies at an angle θ to the x-axis, which is designated as the azimuth of the major axis, in order to describe the polarisation orientation. When creating an anisotropic nanopore, the larger dimension H (see FIG. 2) of the oblate spheroidal nanopore forms perpendicularly to the polarisation orientation of the writing light beam. The dimension H defines the slow axis of the birefringence of the nanostructure, so the birefringence slow axis is perpendicular to the polarisation direction. Hence, the slow axis orientation of written nanostructures can be set by adjusting the polarisation direction of the writing pulse or pulses. The ellipse 60 is also described by an angle χ, which is the angle between the major axis 61 and a line connecting the intersection of the major axis with the ellipse boundary and the intersection of the minor axis with the ellipse boundary. This angle specifies the ellipticity of the ellipse, which is defined as tan (χ). A value of 1 for the ellipticity indicates that the ellipse is actually a circle, so the light is circularly polarised. A value of 0 for the ellipticity indicates that the ellipse is just a line, so the light is linearly polarised. Values greater than 0 and less than 1 indicate elliptical polarisation. For the present method, the writing pulse or pulses have a non-circular polarisation, namely an elliptical or a linear polarisation, so the writing pulses can be described as having an ellipticity of less than 1, in other words 0≤ellipticity<1.

Figure 10:
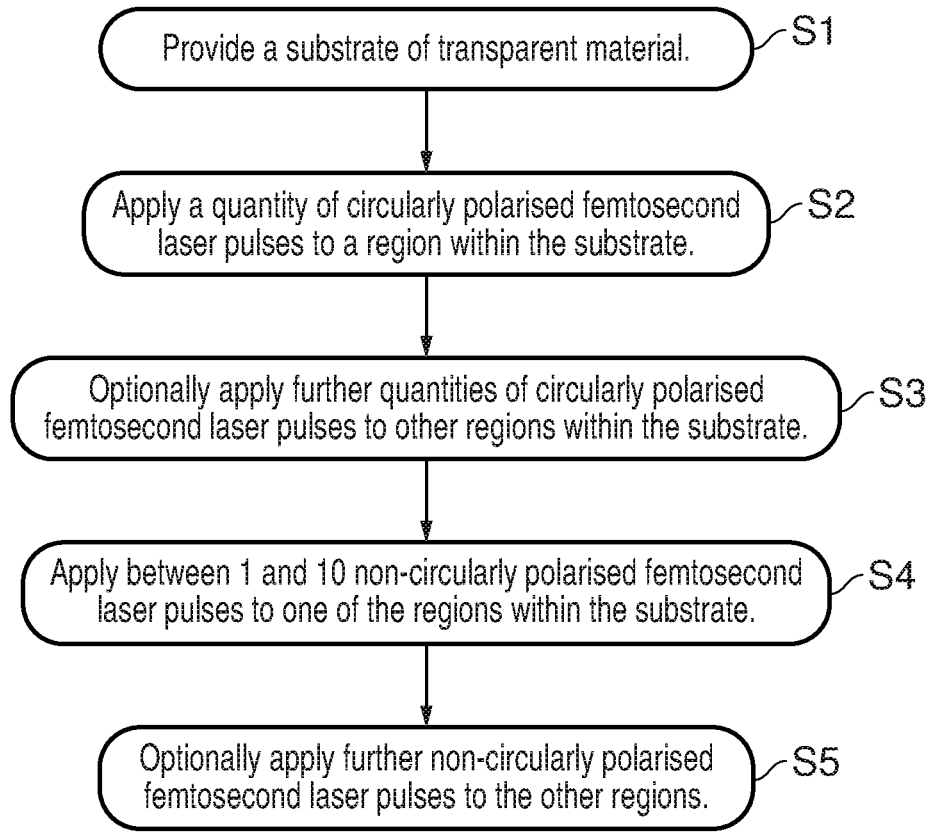
FIG. 10 shows a flow chart of steps in an example of a method as described herein.

FIG. 10 shows a flow chart of steps in an example of a method as disclosed herein. In a first step S1 a substrate of transparent material is provided. In a second step S2, a seeding stage is performed, in which a plurality, such as between 40 and 200, femtosecond pulses of circularly polarised light are applied or delivered to a region or volume within the substrate, by focusing the beam of pulses to a focal point in the volume. In an optional third step S3, the second step is repeated one or more times in order to apply further pluralities of circularly polarised laser pulses to other volumes in the substrate. These steps have the result of forming substantially spherical, isotopically shaped, nanopores in each region; this structural modification places the material of the substrate into a reactive state or condition from which anisotropic nanopores can readily be created. In a fourth step S4, a writing stage is performed, in which a single (or alternatively between two and ten) femtosecond pulse of non-circularly polarised laser light is delivered or applied to one of the volumes in the substrate where the reactive state has been formed, again by focusing into the volume. By non-circularly polarised it is meant that the pulse has a linear or an elliptical polarisation. This pulse provides energy with an electric field distribution owing to the polarisation state which acts to alter the shape of the spherical nanopores of the reactive state and make the nanopores in the region oblate and anisotropic. In an optional fifth step S5, other individual (or from two to ten) non-circularly polarised pulses can be applied to other volumes in the substrate that are in the reactive state. For each of the individual non-circularly polarised pulses or groups of pulses, the azimuth or orientation of the polarisation axis can be selected, and the ellipticity can be selected, in order to create nanopores of particular size and orientation, thereby providing birefringence of particular orientation and retardance. These properties can be controlled in order to create a substrate with a birefringence pattern suitable for a desired application, such as the writing of optical data in 5D or the provision of optical devices such as waveplates.

The optional step S3 alternatively may be carried out after step S4, if it is desired to completely write a particular anisotropic nanostructure (collection of nanopores) in a chosen volume before moving to a next volume. The steps S2 and S3, in other words, each application of a plurality of circularly polarised pulses, may be performed with substantially the same laser pulse characteristics or properties for each application, and the same number of pulses. This is not essential, but provides a consistency for the reactive state.

As discussed above, the pulse energy may be selected in conjunction with the pulse number and the numerical aperture of the focusing to provide an appropriate amount of optical energy to create the reactive state and the final nanostructure. For example, values of pulse energy in the range of 0.8 to 1.5 µJ or 0.8 to 2 µJ per pulse may be appropriate. Alternative pulse energies may be appropriate in other circumstances, depending on the wavelength of the laser beam and the numerical aperture, since these parameters affect the energy density and the interaction of the beam with the material. For example, the pulse energy might be in the range of 0.5 to 2 µJ, or 0.6 to 2 µJ, or 0.7 to 2 µJ, or 0.9 to 2 µJ, or 1 to 2 µJ, or 1.5 to 2 µJ, or 0.5 to 1.5 µJ, or 0.6 to 1.5 µJ, or 0.7 to 1.5 µJ, or 0.9 to 1.5 µJ, or 1 to 1.5 µJ. In some circumstances, the pulse energy may be at least 0.5 µJ, or at least 0.6 µJ, or at least 0.7 µJ, or at least 0.8 µJ, or at least at least 0.9 µJ or at least 1.0 µJ, or at least 1.1 µJ, or at least 1.2 µJ, or at least 1.3 µJ, or at least 1.4 µJ, or at least 1.5 µJ, and may be no greater than 0.8 µJ, or no greater than 0.9 µJ, or no greater than 1.0 µJ, or no greater than 1.1 µJ, or no greater than 1.2 µJ, or no greater than 1.3 µJ, or no greater than 1.4 µJ, or no greater than 1.5 µJ, or no greater than 1.6 µJ, or no greater than 1.7 µJ, or no greater than 1.8 µJ, or no greater than 1.9 µJ, or no greater than 2.0 µJ, or no greater than 2.2 µJ or no greater than 2.5 µJ. Considering pulse energy in relation to numerical aperture (suitable values for which are described in more detail below), larger pulse energies may be selected in combination with lower numerical apertures. For relatively large numerical apertures, the pulse energy can be reduced, and might for example be taken as low as 0.05 µJ. Hence, the pulse energy might be in the range of 0.05 µJ to 0.5 µJ. Other ranges that may be useful include 0.1 µJ to 0.5 µJ, 0.2 µJ to 0.5 µJ, 0.3 µJ to 0.5 µJ, 0.4 µJ to 0.5 µJ, 0.05 µJ to 0.6 µJ, 0.05 µJ to 0.7 µJ, 0.05 µJ to 0.8 µJ, 0.05 µJ to 0.9 µJ, 0.05 µJ to 1.0 µJ, 0.05 µJ to 1.5 µJ and 0.05 µJ to 2.0 µJ, for example.

The pulse energies noted above have been found to be useful in conjunction with pulse durations in the range of 300 to 700 fs in particular, and also in the range of 500 to 900 fs, although other pulse energies may be used with this pulse duration range if appropriate. With appropriate selection of numerical aperture of the focusing arrangement, other pulse durations might be relevant. For example, the pulse duration may be in the range of 300 to 900 fs In other cases, the pulse duration may be in the range of 300 to 400 fs, 300 to 500 fs, 300 to 600 fs, 300 to 700 fs, 300 to 800 fs, 400 to 500 fs, 400 to 600 fs, 400 to 700 fs, 400 to 800 fs, 400 to 900 fs, 500 to 600 fs, 500 to 700 fs, 500 to 800 fs, 500 to 900 fs, 600 to 700 fs, 600 to 800 fs, 600 to 900 fs, 700 to 800 fs, 700 to 900 fs, or 800 to 900 fs. Pulses shorter than 300 fs or longer than 900 fs may be suitable in particular circumstances. For example the pulse duration may be as short as 100 fs or 200 fs, or as long as 1000 fs, so that the duration is chosen to be in a range with a lower limit of 100 fs or 200 fs, and an upper limit of 300 fs, or 400 fs, or 500 fs, or 600 fs, or 700 fs, or 800 fs, or 900 fs, or 1000 fs.

The wavelength of the laser beam may be at or around 1030 nm, such as within the range of 1000 nm to 1060 nm. Other wavelengths may also be used, including shorter wavelengths such as at or around 515 nm and at or around 343 nm. Hence, the wavelength might be chosen in the range of 340 nm to 1100 nm. Other smaller ranges may be appropriate depending on the other operating parameters, such as in the range of 300 nm to 1000 nm, 400 nm to 1000 nm, 500 nm to 1000 nm, 600 nm to 1000 nm, 700 nm to 1000 nm, 800 nm to 1000 nm, 900 nm to 1000 nm, 300 nm to 900 nm, 400 nm to 900 nm, 500 nm to 900 nm, 600 nm to 900 nm, 700 nm to 900 nm, 800 nm to 900 nm, 300 nm to 800 nm, 400 nm to 800 nm, 500 nm to 800 nm, 600 nm to 800 nm, 700nm to 800 nm, 300 nm to 700 nm, 400 nm to 700 nm, 500 nm to 700 nm, 600 nm to 700 nm, 300 nm to 600 nm, 400 nm to 600 nm, 500 nm to 600 nm, 300 nm to 500 nm, 400 nm to 500 nm or 300 nm to 400 nm, or any of 300 nm, 400 nm, 500 nm, 600 nm, 700 nm, 800 nm, 900 nm or 1000 nm to 1060 nm or 1100 nm or 1200 nm. Alternatively, the ranges may extend down to 200 nm in some examples. Longer wavelengths may also be used, so that the upper end of the above-listed ranges might instead be 1300 nm, or 1400 nm, or 1500 nm, or 1600 nm, or 1700 nm, or 1800 nm, or 1900 nm, or 2000 nm, or 2100 nm, or 2200 nm, or 2300 nm, or 2400 nm, or 2500 nm. Overall, therefore, the wavelength might lie in the range of 200 nm to 2500 nm. Any suitable laser source can be used to generate the writing beam, but a Ti:sapphire laser, operating to generate a femtosecond output tuneable within the wavelength range of 650 nm to 1100 nm may be used. Also, higher harmonics of this near-infrared range could be used. Another example laser is an ytterbium-doped potassium gadolinium tungstate regenerative amplified laser, mod-elocked to provide pulses in the femtosecond domain. Other lasers and optical sources operable in the visible and/or near-infrared spectral range could also be used.

The numerical aperture of the focusing arrangement may for example be about 0.16, or a value near to 0.16, such as between 0.14 and 0.18, or between 0.12 and 0.20, or between 0.10 and 0.22, or may be within a larger range such as 0.16 to 0.4. Lower numerical apertures might also be used, including as low as about 0.05. Therefore, in some example the numerical aperture might be between 0.05 and 0.4, or 0.05 and 0.3, or 0.05 and 0.2, or 0.05 and 0.15, or 0.05 and 0.1, or 0.05 and 0.09, or 0.05 and 0.08, or 0.05 and 0.07, or 0.05 and 0.06.

Hence, a variety of ranges for all the various laser parameters might be chosen. As will be appreciated, multiple parameters can be adjusted to achieve a selected level of energy delivery to the substrate material, and the skilled person would expect to be able explore the parameters across wide ranges to produce the selected level. This increases the flexibility of the described method; it is not constrained to a small selection of operating parameters, and successful results may be achieved within large ranges, so parameters can be chosen with regard to convenience and available apparatus, for example.

These various parameters have particular relevance for the writing of Type X nanostructures, but may also be used for the writing of Type II nanostructures if an appropriate level of optical energy is delivered.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] P G Kazansky, H Inouye, T Mitsuyu, K Miura, J Qiu, K Hirao and F Starrost, Phys. Rev. Lett., vol. 82, 2199-2102, 1999
[2] J Zhang, M Gecevičius, M Beresna, P G Kazansky, Phys. Rev. Lett., vol. 112(3), 33901, 2014
[3] E Bricchi, B G Klappauf, P G Kazansky, Opt. Lett., vol. 29, 119-201, 2004.
[4] S S Fedotov, A G Okhrimchuk, A S Lipatiev, A A Stepko, K I Piyanzina, G Y Shakhgildyan, M Y Presniakov, I S Glebov, S V Lotarev, V N Sigaev, Opt. Lett., vol. 43, 851, 2018
[5] WO 2015/150566
[6] Y Shimotsuma, P Kazansky, J Qui and K Hirao, Phys Rev. Lett. vol. 91, 247405 (2003)
[7] M Beresna, M Gecevicius, M Lancry, B Poumellec and P G Kazansky, Appl. Phys. Lett. vol. 103, 131903 (2013)
[8] C Hnatovskya, R S Taylor, P P Rajeev, E Simova, VR Bhardwaj, D M Rayner and P B Corkum, Appl. Phys. Lett. vol. 87, 014104 (2005)
[9] GB 1802497.6

The invention claimed is:

1. A method of fabricating an optical element, wherein the method is a two-stage method comprising a seeding stage and a writing stage, comprising:
    providing a substrate of a transparent material;
    carrying out a seeding stage comprising applying 40 or more circularly polarised focussed femtosecond laser pulses, being seeding pulses, to a volume within the substrate to create a non-birefringent structure of spherical nanopores in the volume and create an intermediate stage in the substrate; and
    following the seeding stage, carrying out a writing stage comprising applying at least one and not more than ten non-circularly polarised focussed femtosecond laser pulses, being writing pulses, to the volume to transform the spherical nanopores into a birefringent structure of randomly distributed oblate spheroidal nanopores.

2. A method according to claim 1, in which applying the non-circularly polarised focussed femtosecond laser pulses to the volume comprises applying a single non-circularly polarised focussed femtosecond laser pulse to the volume.

3. A method according to claim 1, in which the plurality of circularly polarised focussed femtosecond laser pulses comprises between 40 and 200 pulses inclusive.

4. A method according to claim 1, in which the non-circularly polarised focussed femtosecond laser pulses have a linear polarisation, with an ellipticity of zero.

5. A method according to claim 1, in which the non-circularly polarised focussed femtosecond laser pulses have an elliptical polarisation, with an ellipticity of less than one.

6. A method according to claim 1, comprising selecting an orientation of the non-circular polarisation to create oblate spheroidal nanopores with an intended major axis orientation, so as to define a particular birefringence slow axis orientation for the nanopores.

7. A method according to claim 1, comprising selecting an ellipticity of the non-circular polarisation to create oblate spheroidal nanopores with an intended birefringence retardance value.

8. A method according to claim 1, comprising selecting a number of non-circularly polarised focussed femtosecond laser pulses to be applied to create oblate spheroidal nanopores with an intended birefringence retardance value.

9. A method according to claim 1, further comprising applying further pluralities of circularly polarised focussed femtosecond laser pulses and applying at least one and not more than ten non-circularly polarised focussed femtosecond laser pulses to further volumes within the substrate.

10. A method according to claim 9, in which the volumes are contiguous.

11. A method according to claim 9, in which the volumes are spaced apart.

12. A method according to claim 9, in which the plurality of circularly polarised focussed femtosecond laser pulses applied to each volume within the substrate have the same number of pulses and the same pulse characteristics.

13. A method according to claim 9, comprising varying an orientation of the non-circular polarisation and/or an ellipticity of the non-circular polarisation of the non-circularly polarised focussed femtosecond laser pulses for different volumes within the substrate in order to create oblate spheroidal nanopores with birefringence slow axis orientation and/or retardance that differs between the volumes.

14. A method according to claim 13, in which the volumes are spaced apart in three dimensions with the substrate to define voxels and the orientation and/or ellipticity are varied to encode data in the nanopores of each voxel, such that the optical element is an optical data storage element.

15. An optical element fabricated according to a method of claim 1.

16. A method according to claim 1, in which the transparent material comprises undoped or doped silica glass.

17. A method of processing an optical substrate comprising:
    providing a substrate of a transparent material; and
    carrying out a seeding stage comprising applying to each of a plurality of volumes within the substrate 40 or more circularly polarised focussed femtosecond laser pulses, being seeding pulses, to create a non-birefringent structure of spherical nanopores in each volume and create an intermediate stage in the substrate for transformation into a birefringent structure of randomly distributed oblate spheroidal nanopores.

18. A method according to claim 17, in which the plurality of circularly polarised focussed femtosecond laser pulses applied to each volume are the same in number and pulse characteristics.

19. A method of storing data in a multi-dimensional optical memory comprising:
    providing an optical substrate of transparent material comprising a non-birefringent structure of spherical nanopores in each of a plurality of volumes within the substrate, wherein the substrate is in an intermediate stage; and
    applying to each of at least some of the volumes at least one and not more than ten non-circularly polarised focussed femtosecond laser pulses, being writing pulses, to transform the spherical nanopores into a birefringent structure of randomly distributed oblate spheroidal nanopores, wherein for each volume the orientation of the non-circular polarisation and/or the ellipticity of the non-circular polarisation is selected in order to achieve a desired birefringence slow axis orientation and/or birefringence retardance value for the oblate spheroidal nanopores in order to encode data.

* * * * *